United States Patent
Hjálmtysson et al.

(10) Patent No.: US 6,493,325 B1
(45) Date of Patent: Dec. 10, 2002

(54) METHOD AND APPARATUS FOR PROVIDING TELEPHONY OVER A COMPUTER NETWORK

(75) Inventors: Gisli Hjálmtysson, Gillette, NJ (US); Hosagrahar V. Jagadish, Ann Arbor, MI (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/304,043

(22) Filed: May 4, 1999

Related U.S. Application Data

(60) Provisional application No. 60/084,238, filed on May 5, 1998.

(51) Int. Cl.$^7$ .......................... H04L 12/16; H04Q 11/00; G06F 15/177
(52) U.S. Cl. ................. 370/261; 370/260; 709/221
(58) Field of Search ................... 370/465, 522, 370/395.5, 395.52; 709/200, 221, 218, 245; 379/70, 71, 72, 75, 77, 74, 88.12, 88.17, 88.18, 88.26, 88.25, 212, 216, 211

(56) References Cited

U.S. PATENT DOCUMENTS

| | | | |
|---|---|---|---|
| 5,493,568 A | * | 2/1996 | Sampat et al. .............. 370/261 |
| 5,553,063 A | * | 9/1996 | Dickson ...................... 370/294 |
| 5,604,737 A | * | 2/1997 | Iwami et al. ................ 370/352 |
| 5,608,786 A | * | 3/1997 | Gordon ....................... 358/402 |
| 5,726,984 A | * | 3/1998 | Kubler et al. ............... 370/338 |
| 5,732,216 A | * | 3/1998 | Logan et al. ............... 704/201 |
| 5,742,596 A | * | 4/1998 | Baratz et al. ............... 370/356 |
| 5,742,773 A | * | 4/1998 | Blomfield-Brown et al. . 341/61 |
| 5,751,706 A | * | 5/1998 | Land et al. ................. 370/352 |
| 5,835,495 A | * | 11/1998 | Ferriere ...................... 370/352 |
| 5,999,525 A | * | 12/1999 | Krishnaswamy et al. ... 370/352 |
| 6,026,087 A | * | 2/2000 | Mirashrafi et al. .......... 370/352 |

* cited by examiner

Primary Examiner—Wellington Chin
Assistant Examiner—William Schultz
(74) Attorney, Agent, or Firm—Kenyon & Kenyon

(57) ABSTRACT

A method and system facilitate telephony over computer based networks. The parties to a telephone call need not have the same telephone application software capabilities before the call is initiated nor does the network have to provide standard signaling. Instead, in accordance with the method and system one of the parties defines to the other party the encoding/decoding technique to be used in the processing of the call. The definition can be either by supplying a copy of the application to the other party or by providing the other party with an indirect reference to where the application can be obtained.

25 Claims, 2 Drawing Sheets

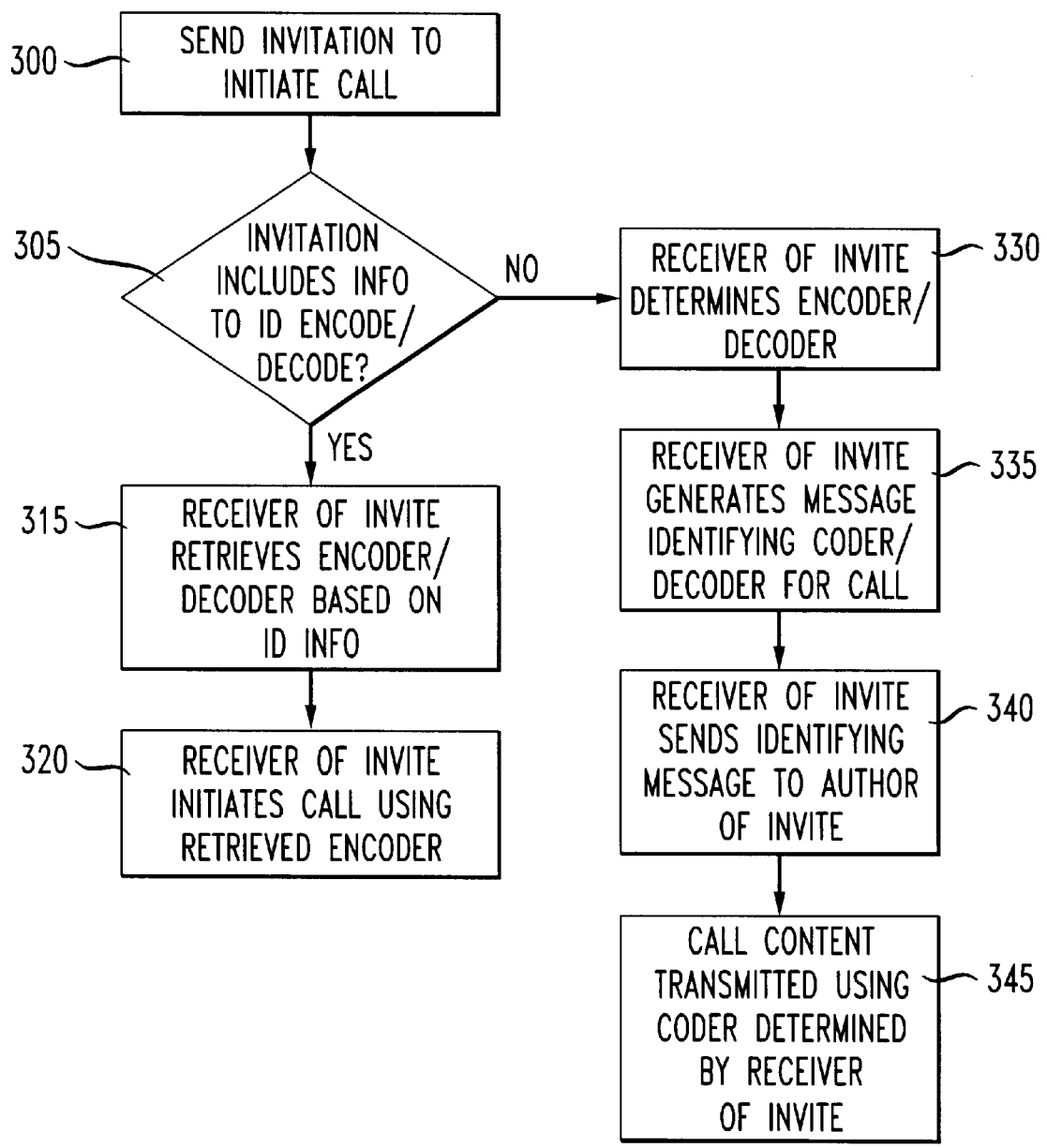

METHOD AND APPARATUS FOR PROVIDING TELEPHONY OVER A COMPUTER NETWORK

CROSS-REFERENCE TO RELATED APPLICATIONS

This application claims benefit of U.S. provisional application No. 60/084,238 filed on May 5, 1998.

BACKGROUND OF THE INVENTION

The present invention is directed to a method and apparatus for providing telephony over a computer network. More specifically, the present invention is directed to a method and apparatus by which a party can encode a telephone call and notify the receiver of the call of the encoding or decoding technique appropriate for conducting the call.

For a long time individuals have been able to communicate via telephone. Most commonly, this takes the form of transmissions of communications over a network such as a public switch telephone network (PSTN) which provides connectivity between two or more parties. In the classical telephone communication environment the network has its own predefined signaling requirements and the telephones which are connected to the network interface with those requirements.

As communication techniques have expanded it has become desirable to provide telephony over computer networks. One example of such telephony is referred to as Internet telephony, that is, telephony provided over a network which implements the TCPIP, protocols associated with a communications network commonly referred to as the Internet. In fact there is heightened interest in Internet telephony in that there is little or no marginal cost incurred by telephone connections utilizing the Internet. Despite the apparent benefit of providing Internet telephony, it has not as yet become a popular means of communication. One possible reason is that there is a low quality of continuous media over the Internet. Furthermore, the fact that various Internet telephony applications use separate and distinct proprietary encoding schemes and application signaling provides an obstacle to more universal use of the Internet for telephony. Unfortunately, the possibility that two parties desiring to communicate with one another via Internet telephony will in fact be employing two different proprietary encoding schemes is too high to encourage an explosive growth of this communication technique. The field has not been able to overcome the absence of a communication standard whereby respective parties have software applications that more easily communicate with one another. This problem exists even within the Internet itself where there are gateways that enable software based telephony programs to call regular telephones or gateways that allow telephones to call a computer application. In both of these gateway scenarios the problem still arises that the application software encoding techniques are not uniform or standardized or universal and it is difficult to provide an interface that makes Internet telephony a more common communication experience.

It would be beneficial if a technique could be provided that would facilitate telephony over a computer network without requiring a standardization or uniformity of encoding and signaling requirements.

SUMMARY OF THE INVENTION

The present invention provides a method and an apparatus that facilitate telephony over computer networks. In accordance with an embodiment of the present invention a first party initiating a call identifies to a second party, the called party, the encoding technique which will be utilized in connection with the processing of the call. This identification can take the form of either transmitting the application that will decode the call or the identification can be constituted by an indirect reference to another source of the encoding/decoding application. In this circumstance the calling party does not have to concern itself with whether the called party has the capability of encoding/decoding in accordance with the technique that is used by the first party. No negotiation of signaling standards is required. Instead, the called party can easily adapt to the signaling requirements of the calling party.

In an alternative embodiment the calling party can send an invitation to the called party to initiate a telephone call via the computer networks. In that circumstance either the calling party or the called party can determine the coding/decoding technique to be employed. For instance, the calling party can either directly or indirectly identify the standard or signaling techniques that it wishes to employ during the course of the telephone call either directly or indirectly as in the first embodiment, or alternatively the called party can define the encoding/decoding technique to be utilized during the course of the telephone call. In the latter circumstance the second party receiving the invitation would initiate the call and then transmit encoding/decoding identification information to the first party. The second party either explicitly defines the application to be utilized or provides an indirect reference which can be used to retrieve the appropriate application so as to conduct the telephone call.

In yet another embodiment of the invention a method is provided by which a computer based telephone instrument can initiate a telephone call to a regular telephone. In this circumstance a tale end hop off (TEHO) gateway translates the call between the computer network and a standard telephony network such as the PSTN. In this circumstance the computer based telephone party informs the TEHO about the telephone application utilized for encoding and decoding. The TEHO either receives the application from the first party or retrieves it based on an indirect reference provided by the first party. At that time the TEHO then can encode and decode the call portion that is transmitted over the computer network between the calling party and the TEHO. The TEHO then operates as a translator between the two networks so that once it has received information from either network it places it in the appropriate format for transmission to the party connected to the other network.

In yet another embodiment of the present invention a regular telephone can initiate a call to a computer based telephone coupled to a computer network. In this circumstance a front end hop on gateway (FEHO) can either inform the called party about the application program which it intends to utilize in connection with the call initiated from a standard telephone to which the FEHO is connected or, alternatively the FEHO can notify the called party that a call connection is desired and can await receipt of a notifier that identifies the telephone application which the called party intends to use in connection with the portion of the call connection between the FEHO and the called party.

Other advantages and features of the present invention will be described in the detailed description that follows.

BRIEF DESCRIPTION OF THE DRAWINGS

FIG. 3 illustrates a flow diagram describing a method in accordance with a second embodiment of the present invention.

DETAILED DESCRIPTION

The present invention provides a method and a system by which telephony can be provided over a computer network. A number of different scenarios in which the present application can be implemented will be described with reference to FIG. 1 which illustrates a system into which the present invention can be incorporated.

Figure 1:
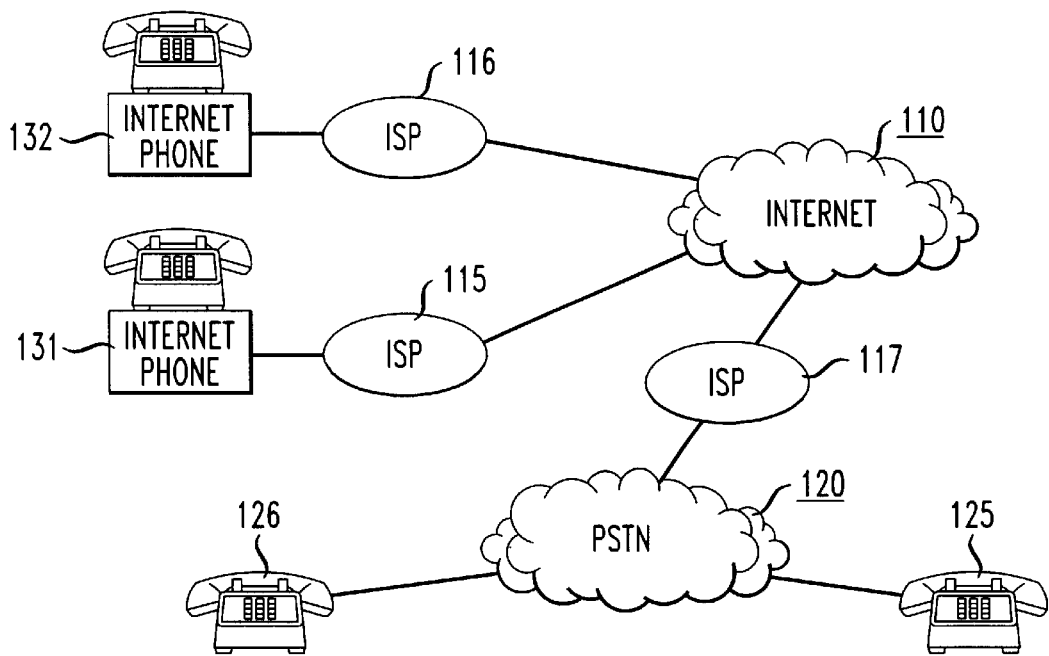
FIG. 1 illustrates a system configuration in which an embodiment of the present invention may be utilized.

In FIG. 1 computer network 110, here for example the Internet, can be used to provide data communications between various computer devices. In this embodiment Internet telephones 131 and 132 are respectively coupled to Internet service providers (ISPs) 115 and 116 respectively. In one embodiment which will be described below telephony over the data network will be provided between these two Internet phones. Also coupled to the data or computer network 110 is an Internet service provider 117 which provides access to a regular telephony network such as the public switch telephone network (PSTN) 120. The PSTN provides access to telephone 125 as well as communications between telephone 125 and other telephones which might be coupled to the network, for example telephone 126.

A first embodiment of the present invention relating to providing communications between the Internet telephones 131 and 132 will now be described.

As indicated in the description of the prior developments concerning computer telephony Internet telephones 131 and 132 may operate using different telephone application software, that is, each may employ different coding and decoding techniques which in fact could be proprietary techniques. In that circumstance in the prior systems Internet telephone 131 would not be able to complete a telephone call with Internet telephone 132 because there would be no commonality with respect to the coding/decoding techniques which are required for enabling a transfer of information between these two end terminals. The present invention provides a method for overcoming this problem whereby one of the Internet phones, for instance Internet phone 131 can notify the other Internet phone 132 at the beginning of the call and identify the coding/decoding technique that the Internet phone 131 wishes to use in connection with a telephone call to be completed between these two points. At least two identification techniques are available. The identification can be constituted by an indirect reference to an address or location where Internet phone 132 can retrieve the appropriate coding/decoding technique in software. Alternatively, Internet telephone 131 can transmit to Internet telephone 132 the coding/decoding technique in software so that Internet telephone 132 could then use that technique in connection with the telephone conversation between the two parties. This transfer of an active message, that is, software that enables the coding and decoding at another terminal to be consistent with the coding and decoding taking place at a first terminal is described in co-pending provisional application entitled "A METHOD AND APPARATUS FOR COMMUNICATING MESSAGES OF VARYING PROTOCOLS OVER A SINGLE COMMUNICATIONS NETWORK", filed on May 5, 1998 the entire disclosure of which is incorporated herein by reference.

Figure 2:
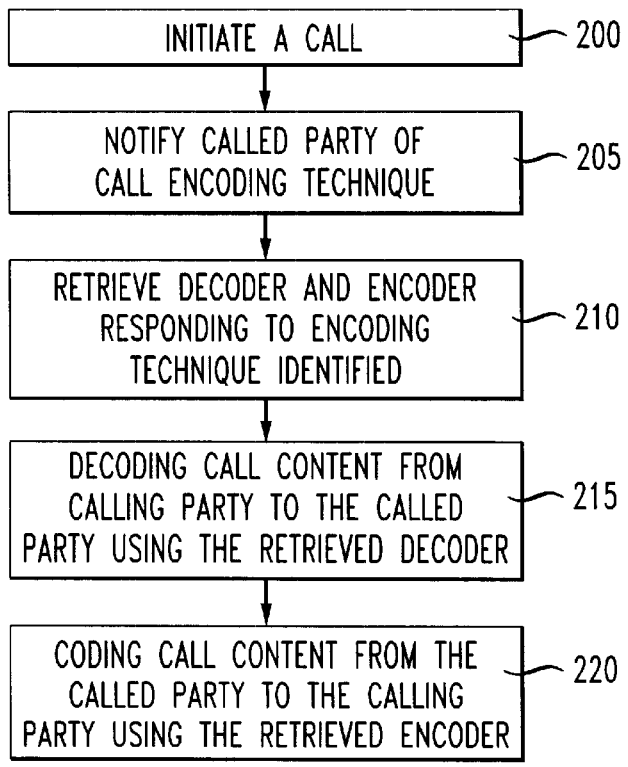
FIG. 2 provides a flow diagram in connection with an implementation of a method in accordance with an embodiment of the present invention.

FIG. 2 provides a flow diagram useful in understanding a method which can be implemented to effect the present invention. In the method one of the parties, for example Internet telephone 131 can initiate a call, step 200. The call initiation would provide an address or identifier of the intended recipient of the call. The calling party could then notify the called party of the call encoding technique to be employed during the course of the "connection", step 205. This notification can either be an indirect reference to a location from which the called party can retrieve the encoding/decoding technique, for example a URL (universal resource locator) which could identify a cite from which the called party could retrieve the technique in question. Alternatively, the notification could include the necessary code or software to perform the encoding/decoding operations such that Internet telephone 131 would in effect be directly providing the necessary capabilities for completing the call and conducting the call to the called party at Internet telephone 132. Once notification is provided then the Internet phone at the called party can retrieve the decoder and encoder technique responding to the encoding technique identified, step 210. As indicated this can either be done by going to the location identified by the indirect reference or by simply loading the information directly received from the Internet telephone 131. After retrieving the encoder/decoder capability the receiver or called party can decode call content from a calling party using the retrieved decoder, step 215. In a return message or as part of the telephone call the called party can then code call content that is to be sent to the calling party using the retrieved encoder as well, step 220. Thus, in accordance with the method of the present invention one party, for example the calling party, can identify either directly or indirectly the encoding/decoding technique to be utilized for completing the call. The Internet telephone receiving the coding/decoding information could then store it either temporarily or permanently for further use so that, for instance where the notification includes an indirect reference to the coding/decoding technique, the called party can determine whether a local cache holds the appropriate technique and can avoid unnecessary downloading time where the technique is already available at the called party.

FIG. 3 illustrates a flow diagram describing an operation where a first party initiates a reverse calling situation. In particular, again assuming that the initiating party is at Internet telephone 131 and the other party is at Internet telephone 132, the initiating party can send an invitation to initiate a call, step 300. The invitation would include the appropriate addressing to identify the intended recipient of the invitation. The invitation either can be a plain invitation to the second party to initiate a call, or the invitation could further include information that identifies the encoding/decoding technique which is to be utilized during the course of the call. The content of the invitation is examined in step 305. If the invitation includes such information relating to an encoding/decoding technique then the receiver of the invitation can retrieve the encoder/decoder based on the identification information, step 315 in much the same way that the called party retrieves information in step 210 of FIG. 2. The retrieval can either be a loading of directly provided information or it could be a downloading of information accessed based on an indirect reference included in the invitation. Once the receiver has retrieved the encoder/decoder then it can initiate the call back to the sender of the invitation using the retrieved encoder, step 320.

Alternatively, if the invitation does not include information that identifies the encoder/decoder to be utilized then the receiver of the invitation can determine which encoding/ decoding technique to be utilized, step 330. The receiver of the invitation can generate a message that identifies the coder/decoder to be utilized in the call, step 335. This message can of course either include the application necessary to implement the coder/decoder or could instead include an indirect reference that identifies a location from which the coder/decoder can be retrieved. The receiver of the invitation then sends the identifying message to the author of the invitation, step 340. Call content can then be transmitted using the decoder determined by the receiver of the invitation, step 345, as the receiver of the invitation initiates the phone call.

As described to this point the present invention provides tremendous flexibility for enabling computer-based telephony between two terminals which may implement different types of telephone applications, thereby avoiding the need for standardizing either the computer network signaling for transmission of telephone call or the standardization of the telephone applications themselves.

A further embodiment of the present invention is provided in connection with providing for telephone calls between, for instance an Internet telephone such as 131 and a standard or plain old telephone service (POTS) telephone such as 125. In this circumstance there must be some point or node between the two telephones which translates the call between the computer network realm and the public telephone network realm. This can be done in the following manner. Presume in a first instance an Internet phone wishes to initiate a call to a standard telephone 125. The Internet phone can, in a manner similar to that described in relationship to FIG. 2, present a notice message through the Internet toward an ISP, for example 117 that acts as a gateway to the PSTN and ultimately to telephone 125. The gateway at ISP 117 has the ability to receive the message and act upon it. The message transmitted from the Internet telephone is similar to the message transmitted by that telephone to Internet telephone 132, that is, the message includes a notification of the coding/decoding technique to be utilized during the course of the telephone call. The gateway, in this instance a tail end hop off (TEHO) gateway receives this notice and can either download the decoding technique identified by an indirect reference in the notice, or immediately load the decoding technique as identified within the body of the notification. Once this application is downloaded the TEHO gateway has sufficient capability for interfacing with the Internet phone 131 and conducting a telephone call between the gateway and the Internet phone. The TEHO gateway, after establishing this connection can then establish a connection between the gateway and the telephone 125 via the PSTN 120. These calls can effectively be bridged via translation software which translates the formatted information received from the Internet phone into standard telephone signals which can be transmitted over PSTN 120. Similarly, the gateway receives standard telephone signals and translates them into the appropriate format for transmission back, via Internet 110 and ISP 115, to Internet telephone 131 in a code that is understandable or perceptible by the Internet telephone. In an alternative to this embodiment the TEHO gateway, like the called party in our earlier example, can be the party to define the coding/ decoding technique to be employed during the course of the phone call.

Presume in a second scenario that a calling party is at standard telephone 125 and wishes to initiate a telephone call with Internet phone 131. Then the standard telephone party dials the appropriate number as any standard telephone call would be initiated and the call is routed to ISP 117 which can act as a FEHO or front end hop on gateway. The FEHO gateway can translate the telephone number of the desired party into an appropriate Internet address, or alternatively the gateway could prompt the party at telephone 125 to either vocalize or enter via keypad the desired Internet address. The ISP gateway 117 could then initiate a computer network phone call to Internet telephone 131. As in the scenarios described above the gateway could either define the coding/decoding technique to be utilized during the course of the computer network portion of the call or could allow the Internet telephone to define the appropriate coding/decoding technique. In either case one of the end terminals of the computer network portion of the call can define the technique to be utilized and the other party can load the technique without having had prior knowledge of that specific technique. This enables the computer network connection to be established between the ISP 117 and the Internet telephone 131. Then, as in the first situation described with respect to connecting to a standard telephone, the ISP gateway 117 can bridge the computer network call with the standard telephone network call, in effect translating the signals from the two domains so as to provide a channel by which Internet phone 131 and telephone 125 can communicate. It should be recognized that this invention enables a TEHO gateway to act as both a TEHO and a FEHO and it enables the FEHO gateway to act as both a FEHO and a TEHO. That is either gateway can effect a connection between a POTS phone and a computer based telephone and can act as either a hop-off or hop-on point for such a connection.

The present invention provides a situation where telephony can be provided over a computer network without requiring that the end terminals all have the same telephony applications before a call is initiated. The invention promotes the use of computer telephony without requiring a standardization of the signaling over the computer network or standardization of the applications which can be employed at the terminal points of the respective telephone calls.

What is claimed is:

1. A method for adapting a computer network to provide telephony, the method comprising:

receiving, at a gateway, a call from a telephone intended for a computer network telephone;

coding said received call at said gateway using a first coding technique;

transmitting to the computer network telephone information identifying a technique for decoding a call coded by said first coding technique, said information identifying the technique for decoding including an indirect reference to a location storing said decoding technique program, said location being remote from said destination; and transmitting the coded call to the computer network telephone.

2. The method of claim 1 further comprising:

receiving a response from the computer network telephone wherein the response is coded using said first coding technique.

3. The method of claim 1 wherein said indirect reference includes a pointer.

4. The method of claim 1 wherein said indirect reference includes a URL.

5. The method of claim 1 wherein said information identifying the technique for decoding alternatively includes a program for performing said decoding.

6. A method for adapting a computer network to provide telephony, the method comprising:

receiving at a gateway, a telephone call encoded according to a first technique;

receiving, at said gateway, information identifying a technique for decoding said telephone call, said information identifying the technique for decoding including an indirect reference to a location storing said decoding technique program, said location being remote from said gateway;

decoding said call using said information identifying said technique for decoding; and forwarding said call to a telephone.

7. The method of claim 6 wherein said encoding telephone call is received from a computer network telephone.

8. The method of claim 6 further comprising:

receiving, at the gateway, information identifying said first coding technique;

receiving, at the gateway, a response from the telephone;

encoding the response in accordance with said first technique; and transmitting the coded response to the computer network telephone.

9. The method of claim 1 wherein said indirect reference includes a pointer.

10. The method of claim 6 wherein said indirect reference includes a URL.

11. The method of claim 6 wherein said information identifying the technique for decoding alternatively includes a program for performing said decoding.

12. A method for adapting a computer network to provide telephony, the method comprising:

receiving, at a gateway, a call set up request from a computer network telephone; and receiving, at the gateway, a notice relating to a coding technique and a decoding technique to be employed during the call.

13. The method of claim 12 further comprising:

loading said decoding technique at the gateway in accordance with the received notice.

14. The method of claim 12 further comprising:

transmitting to the computer network telephone a notice relating to said decoding technique to be used by the gateway.

15. The method of claim 14 further comprising:

receiving call information from the computer network telephone, coded to be compatible with said decoding technique.

16. The method of claim 12 wherein said notice includes an indirect reference to software for performing encoding in accordance with said coding technique.

17. A method for adapting a computer network to provide telephony, the method comprising the steps of:

receiving, at a gateway, a call set-up request from a telephone;

receiving, at the gateway, a coding/decoding protocol to be used during the call;

establishing, between the gateway and a destination computer network telephone, said coding/decoding protocol; and coding the call from the telephone to the computer network telephone using the established coding/decoding protocol.

18. A method for establishing a telephone call over a computer network, the method comprising the steps of:

sending an invitation message toward an intended recipient, the invitation message including a reference to a location containing a coding/decoding mechanism to be used in transacting a telephone call with a first party, said location being remote from said intended recipient;

receiving a call from the recipient over the computer network, the call being encoded in accordance with the coding/decoding mechanism referred to in the invitation message; and transmitting toward the intended recipient over the computer network call message packets coded in accordance with the coding/decoding mechanism referred to in the invitation message in the call involving the intended recipient.

19. The method of claim 18 wherein said invitation message comprises an e-mail message.

20. The method of claim 19 wherein said sending the invitation message comprises sending the message over the computer network over which the call is to be transacted.

21. The method of claim 19 wherein said sending the invitation message comprises sending the message over another computer network.

22. A call management method, comprising, at a transmitter:

during a call initialization, transmitting to a receiver program instructions representing a coding/decoding algorithm to be used at the transmitter;

encoding call data according to said coding/decoding algorithm; and transmitting the encoded call data to the receiver.

23. The call management method of claim 22, further comprising, at the receiver:

executing the program instructions to decode the encoded call data.

24. A call management method, comprising, at a receiver:

receiving from a transmitter an identifier of a network location where program instructions representing a coding/decoding algorithm to be used during a call are to be found;

downloading the program instructions from the network location; and executing the program instructions to decode encoded call data received from the transmitter.

25. The call management method of claim 24, further comprising, at the transmitter:

encoding the call data according to said coding decoding algorithm.

* * * * *